United States Patent
Cervini (10) Patent No.: US 7,103,091 B2
(45) Date of Patent: Sep. 5, 2006

(54) COMMON DATA PATH RAKE RECEIVER FOR A CDMA DEMODULATOR CIRCUIT

(75) Inventor: Stefano Cervini, La Jolla, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 755 days.

(21) Appl. No.: 10/141,460

(22) Filed: May 7, 2002

(65) Prior Publication Data

US 2003/0210733 A1 Nov. 13, 2003

(51) Int. Cl.
- *H04B 1/69* (2006.01)
- *H04B 1/707* (2006.01)
- *H04B 1/713* (2006.01)

(52) U.S. Cl. .................................... 375/147
(58) Field of Classification Search ............... 375/147
See application file for complete search history.

(56) References Cited

U.S. PATENT DOCUMENTS

| | | | |
|---|---|---|---|
| 4,164,628 A | 8/1979 | Ward et al. | |
| 4,894,842 A | 1/1990 | Broekhoven et al. | |
| 5,654,979 A * | 8/1997 | Levin et al. | 375/142 |
| 5,764,687 A | 6/1998 | Easton | 375/206 |
| 6,130,906 A | 10/2000 | Davidovici et al. | |
| 6,853,677 B1 * | 2/2005 | Kim et al. | 375/148 |
| 6,934,317 B1 * | 8/2005 | Dent | 375/140 |
| 2001/0034227 A1 | 10/2001 | Subramanian et al. | |
| 2002/0041624 A1 * | 4/2002 | Kim et al. | 375/148 |
| 2003/0067965 A1 * | 4/2003 | Taniguchi et al. | 375/147 |

FOREIGN PATENT DOCUMENTS

| | | |
|---|---|---|
| EP | 0 936748 | 8/1999 |
| EP | 998052 A2 * | 5/2000 |
| EP | 1 139 576 | 10/2001 |

OTHER PUBLICATIONS

Harri Holma, Antti Toskala (Editors); "WCDMA for UMTS: Radio Access for Third Generation Mobile Communications", 2001, John Wiley & Sons, Ltd., XP002249973, pp. 30-33, paragraph 3.4; figure 3.7.

European Search Report, EP 03 25 2826, dated Aug. 7, 2003.

* cited by examiner

*Primary Examiner*—Chieh M. Fan
*Assistant Examiner*—Jia Lu
(74) *Attorney, Agent, or Firm*—Lisa K. Jorgenson; Andre M. Szuwalski (57) ABSTRACT

An architecture for a rake receiver of a CMDA demodulator utilizes a common data path for signal processing. This common data path is shared by all channels (either physical channels or propagation paths within physical channels) to avoid redundant calculations, reduce circuit space and reduce power consumption. The sharing of the common data path for demodulation is made on a time divided manner, with each channel being given sequential access to the data path to perform all or part of a given demodulation function (for example, de-scrambling, de-spreading, de-rotating, and de-skewing accumulation).

22 Claims, 8 Drawing Sheets

COMMON DATA PATH RAKE RECEIVER FOR A CDMA DEMODULATOR CIRCUIT

BACKGROUND OF THE INVENTION

1. Technical Field of the Invention

The present invention relates to spread spectrum communications and, in particular, to signal processing operations for a rake receiver and an integrated circuit chip for performing those operations.

2. Description of Related Art

Many multiple access techniques are known in the art. For example, wireless communications between many users currently use, for example, time division multiple access (TDMA), frequency division multiple access (FDMA), and code division multiple access (CDMA) techniques that allow multiple users to share a limited communications frequency spectrum.

Considerable attention is currently being directed to CDMA techniques which are viewed by those skilled in the art as possessing numerous advantages over other multiple access techniques. These advantages stem from the wideband nature of the CDMA communication format which, contrary to narrowband TDMA and FDMA techniques, spreads signal energy over a wide bandwidth. By spreading in this manner, the frequency spectrum can be reused more effectively to increase communications capacity. Additionally, CDMA systems operate without substantial adverse affect due to the common problems of multipath and fading that plague the wireless terrestrial communications channel. In fact, CDMA systems take advantage of the multipath phenomenon by using diversity combiners to capture the communications energy of multiple paths and thus enhance communications performance.

In order to demodulate two distinct paths of a communications channel, the time offset between those two paths must be determined. Using a demodulator, the CDMA receiver searches through a sequence of offsets and measures the corresponding received energy. If the measured energy exceeds a threshold, the receiver assigns a demodulation element (also referred to in the art as a "finger" of the rake receiver) to the signal representing that particular offset. Once all the paths for a channel are determined and assigned fingers, the signals on those paths are demodulated by the respective fingers and the symbols output from each finger are summed together to recover the communicated signal. Given the time varying nature of the wireless terrestrial communications channel, it is possible, and in fact likely, that the relative offsets between the paths will vary, and thus the individual fingers of the rake receiver must possess the ability to track, adjust and account for offset time changes.

The functioning of the fingers of the rake receiver is asynchronous with respect to each other due to the asynchronous nature of the plural propagation paths. Since the combination operation requires the availability of synchronous symbols from the plural paths of a single channel, a buffer is typically employed to temporarily store the symbol data output from each finger. When the last symbol to be combined for a given channel is output from its processing finger (i.e., the finger tracking the most delayed propagation path), the combining operation is performed with respect to the buffer stored symbols. Locations within the buffer are then made free to store subsequently arriving symbols, and the process repeats. This operation for collecting (accumulating) related symbols carried over different paths for combining is referred to in the art as "de-skewing."

There are a number of recognized drawbacks with the conventional, prior art, buffer-based de-skewing operation. The computations necessary for demodulation are performed locally, that is, within the fingers of the rake receiver. Because of this, it is very difficult, if not impossible, to obtain computation reductions due to the redundant processing operations being performed in each of the fingers. Additionally, each finger submits sequence generation requests in an asynchronous way. Thus, the different fingers will reiterate requests to receive the same sequences at different times. Nonetheless, the sequences used by the fingers are the same, and thus the receiver inefficiently operates to generate more than one sequence per sequence period. All of these issues lead to receivers that are complex in implementation and power consuming in operation.

There is accordingly a need for an improved rake receiver that eliminates the need for separate, local performance of demodulation calculations in each finger.

SUMMARY OF THE INVENTION

Spread spectrum signals transmitted over a plurality of channels are demodulated by performing the spread spectrum demodulating operations along a demodulating data path. Access to the demodulating data path by each channel is managed on a time-shared basis such that performance of spread spectrum demodulating operations on each of the spread spectrum signals occurs in a time divided manner.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
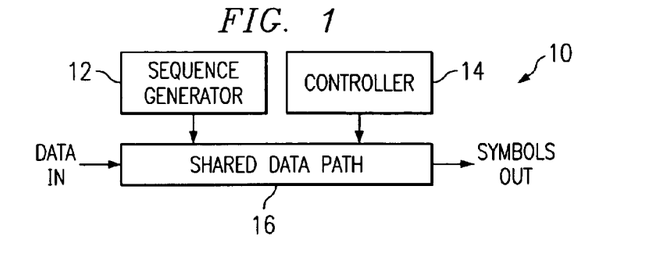
FIG. 1 is a block diagram of a rake receiver in accordance with the present invention.

Reference is now made to FIG. 1 wherein there is shown a block diagram of rake receiver 10 in accordance with the present invention. The receiver 10 includes three major architectural components: a controller 12; a sequence generator 14; and, a data path 16. The data path 16 is used to perform arithmetic and logical calculations relating to channel demodulation. Importantly, the data path 16 is a shared resource. By this it is meant that this same, single, data path 16 is utilized to perform all the demodulation calculations for all communications physical channels and communications paths therein. To accomplish this goal, the data path 16 is time shared by different channels for the purpose of demodulating multiple paths and de-skewing the symbol data. Use of such a shared, single data path 16 resource allows for a reduction in the amount of data to be handled and manipulated, and a reduction and optimization of the amount of calculations that must be performed. Certain operational benefits relating to reduce power consumption and reduced circuit space are also achieved.

Before discussing the details of the shared data path 16, a brief mathematical explanation of its operation is presented to aid in understanding the present invention. Let $p^{(c)}$ be the scrambling sequence assigned to the channel c. Let $q^{(c)}$ be the channelization (OVSF) sequence assigned to the channel c. Further, let NOC refer to the number of physical channels present for handling by the receiver (such that c ranges from 1 to NOC). Let f refer to a propagation path within a channel c. Let NOP refer to the number of propagation paths within the channel (such that f ranges from 1 to NOP). Also, let $u^{(c)}$ be the product of the scrambling sequence and channelization sequence for the channel c $(u^{(c)}:=p^{(c)} \cdot q^{(c)})$. Let $u^{(f,c)}$ denote a translation of the sequence $u^{(c)}$ due to the delay of the f propagation path $(u^{(f,c)}(n)=u^{(c)}(n+t(f)))$.

Still further, let $\tau_f$ refer to the delay of the propagation path f with respect to an earliest received path, quantized to the sampling period. The delay $\tau_f$ can then be expressed as integral number of chips t plus a fraction of a chip $\phi$ such that $\tau_f = t_f + \phi_f$. Let $d^{ph}$ be the received data sequence sampled at phase ph with respect to the chip period (where ph=0 is arbitrarily set and ph ranges from 0 to the number of sample per chip (NOSPC) minus one). Thus, the data sequence $d^{ph(f)}$ refers to a sequence who phase offset corresponds the delay for its propagation path f. It is further recognized that the NOSPC is defined to generalize the sampling rate of the data sequence d (for example, NOSPC=1 corresponds to a 1× chip rate, NOSPC=2 corresponds to a 2× chip rate, and the like). Still further, it is recognized that $ph(f)=\phi_f \cdot NOSPC$.

Figure 2:
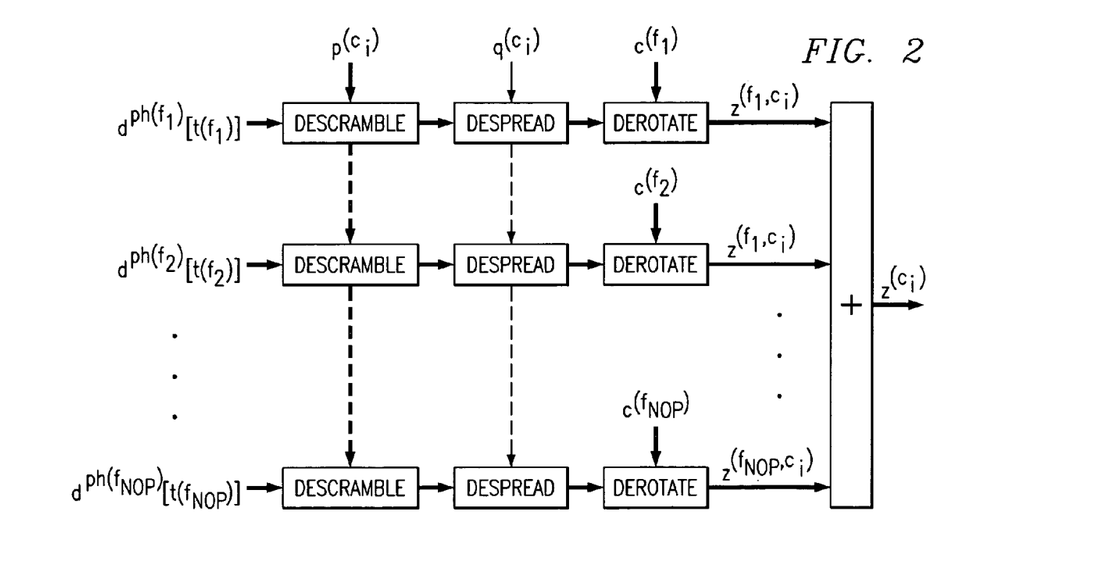
FIG. 2 illustrates the chain of basic operations for the demodulation of a given channel having a number of paths.

FIG. 2 illustrates the chain of basic operations for the demodulation of a given channel $c_1$ having a number of paths f. All lines and arrows denote complex-valued signals with the exception of the channelization sequence q which is a scalar signal. It will be noted that, in processing the received signal for each path, a de-scrambling operation, de-spreading operation, a de-rotation operation and a combining (or accumulation) operation must be performed. The first three operations are performed individually on each path f, while the last operation is performed collectively over all paths. From an arithmetic point of view, the de-scrambling operation is a complex-valued dot product operation performed between the received data sequence d (complex) and the scrambling sequence p (complex). The de-spreading operation is a complex-valued scalar product of the received data sequence d (complex) and the channelization sequence q (scalar). The de-rotation operation is a complex-valued multiplication of the de-scrambled and de-spread output with a channel estimation $c^{(f)}$ (also referred to herein as ch_est) of the propagation path f. The combining operation is performed by accumulating the de-rotated output symbols z (complex) over each of the paths f to produce a symbol z output for the channel.

Figure 3:
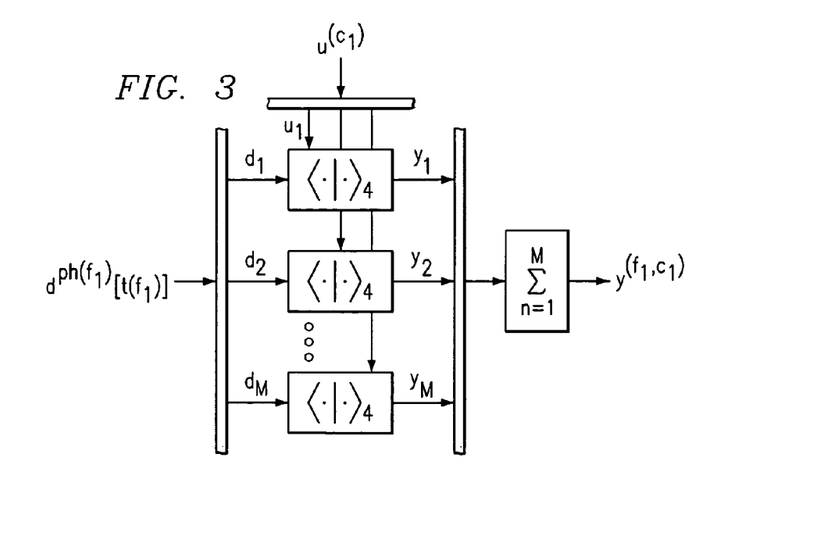
FIG. 3 is a block diagram for a combined de-spreading and de-scrambling operation in accordance with the present invention.

FIG. 3 illustrates block diagram for a combined de-spreading and de-scrambling operation in the shared data path 16 for the present invention. Although the illustration shows the process for a single channel $c_1$ and a single path $f_1$, it will be understood that the illustrated operation performed by the data path 16 is valid for any channel and path. The combined operation is accomplished through the combination of M scalar products of length four. In this case, the scalar product of length 4 is the basic operator for the demodulation of the channels. Blocks of four samples are formatted from the input data sequence d, and are continually passed on the scalar product with u. It will be recognized that the illustration in FIG. 3 is a functional representation. Implementation of the illustrated function in a circuit would preferably utilize just a single scalar product M times for each value of the output sequence y. As the illustration shows the combined operation being performed for only a single path f, the operation must be repeated for each path in the channel c to complete the de-spreading and de-scrambling of the received data sequence d.

In order to keep the data rate of the four-sample blocks to a minimum, a single block formatting, common for all the channels, is preferably employed. This means that same blocks are used for all the channels, no matter what the propagation path f delay. Consequently, there will exist certain instances where a channel has a propagation path that is not aligned with the borders of the blocks. In this scenario, two partial scalar products (each of sample length less than four), one at the front-end and one at the back-end of the data sequence, must be carried out in addition to, and added with, the other full length (sample length equal to four) scalar products.

Figure 4:
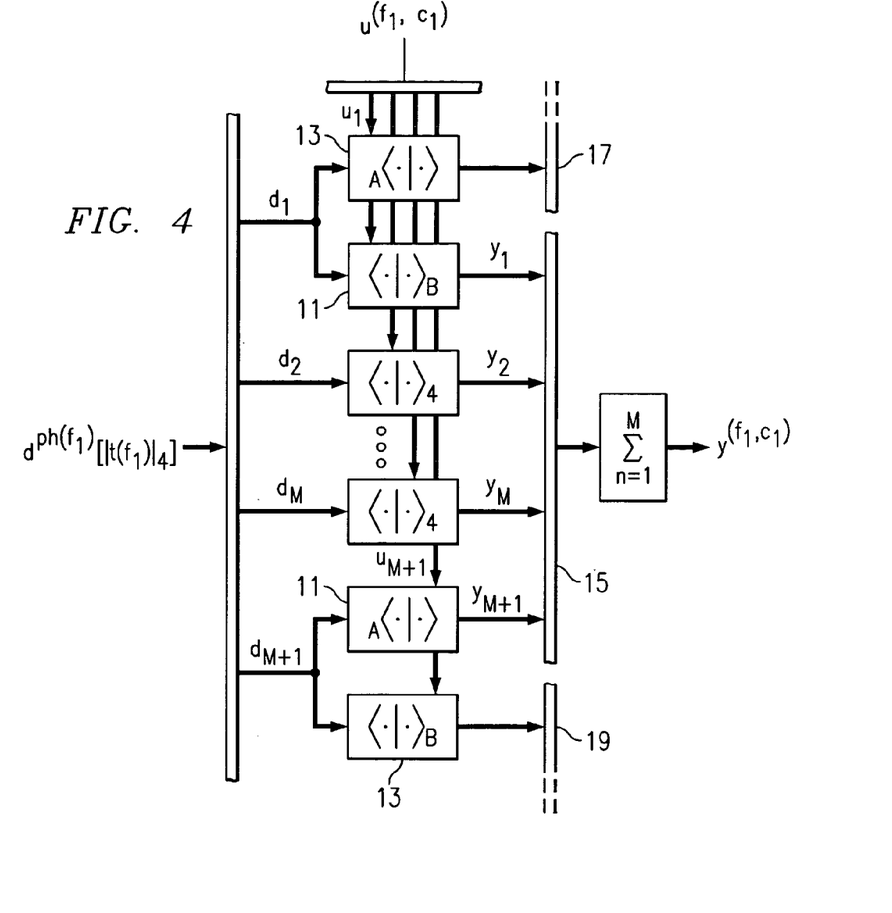
FIG. 4 is a block diagram for a combined de-spreading and de-scrambling operation for misaligned data in accordance with the present invention.

The combined de-spreading and de-scrambling operation of FIG. 3 may be modified, in the manner shown in FIG. 4, to account for this mis-alignment with the single block formatting. Although the illustration shows the process for a single channel $c_1$ and a single path $f_1$, it will be understood that the illustrated operation performed by the data path 16 is valid for any channel and path. The two partial products have respective lengths A and B as defined:

$$A = t(f) \bmod 4$$

$$B = 4 - t(f) \bmod 4.$$

Let $|N|_4$ in the illustration denote the greatest multiple of 4 that it less than N (for example, $|29|_4 = 28$). The inner-most ones (reference 11) of the two partial scalar products produce the terms $y_1$ and $y_2$ which contribute to the current output symbol y (reference 15). The outer-most ones (reference 13) of the two partial scalar products, on the other hand, produce symbols that contribute to the previous symbol (reference 17) and the subsequent symbol (reference 19), respectively. Again, as the illustration shows the combined operation being performed for only a single path f, the operation must be repeated for each path in the channel c to complete the de-spreading and de-scrambling of the received data sequence d.

Figure 5:
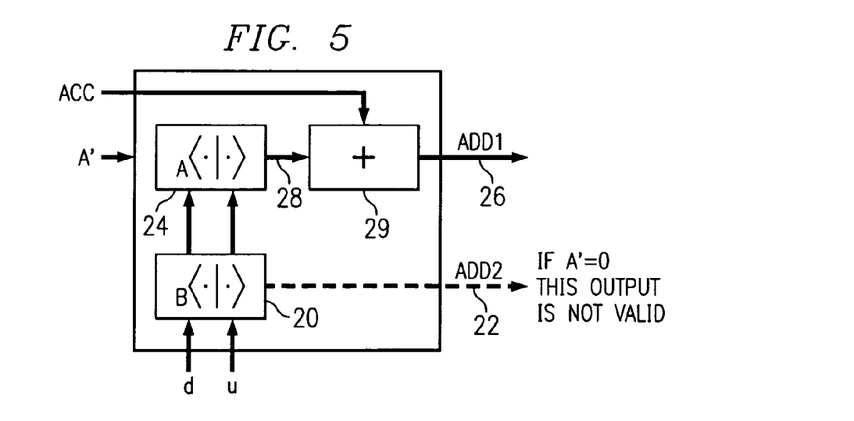
FIG. 5 is a block diagram of a scalar product implementation in accordance with the present invention.

Given the representations shown in FIGS. 3 and 4, the performance of a scalar product of length four may be performed in shared fashion using a scalar product implementation shown in FIG. 5. This implementation is designed to operate such that either a full-length scalar product is produced, or a two partial length scalar products are produced, as needed in accordance with the alignment of the data sequence to the single block formatting. The decision as to which product is produced is made by the input value of A'. If A'=1, two partial length scalar products are produced at 20 and 24, with the first partial product (of d and u) at 20 for the length B as set forth above being produced at output 22 (ADD2), and the second partial product (of d and u) at 24 for the length A as set forth above being produced at 28 and added 29 to the input accumulator value (ACC) for output 26 (ADD1). If A'=0, on the other hand, no output 22 is produced by the first partial product (of d and u) at 24, and instead the products at 20 and 24 combine to produce a full-length scalar product (of d and u) at 28 that is added 29 to the input accumulator value (ACC) for output 26 (ACC1).

It may accordingly be recognized that the scalar product implementation, when A'=1, functions to produce the inner and outer partial products as shown in FIG. 4 that contribute to the current output symbol y (reference 15), the previous symbol (reference 17) and/or the subsequent symbol (reference 19), as needed.

The scalar product implementation of FIG. 5 may be utilized advantageously in a time shared manner to demodulate all channels c. The implementation is accessed by a channel either M times per symbol (if the delay of the propagation path f is block aligned) or M+1 times per symbol (if the delay of the propagation path f is not block aligned). In the latter case, two accesses by a channel (the first and the last per symbol) will produce data (for the two partial products) for the previous and the subsequent symbols as well. As discussed above, the same data block is used for all channels that are to be demodulated, and because of this the implementation is accessed by a first channel, and is then sequentially accessed by all other channels before returning to use with the first channel again. These M or M+1 accesses may be continuous or discontinuous. By this it is meant that the channel may access and use for M or M+1 consecutive times to complete the symbol generation (continuous), or alternatively, and preferably in accordance with the present invention, the channel may make is M or M+1 accesses individually and separately (discontinuous). In either case, a time-shared access to the processing resource is made with respect to the plural channels.

Figure 6:
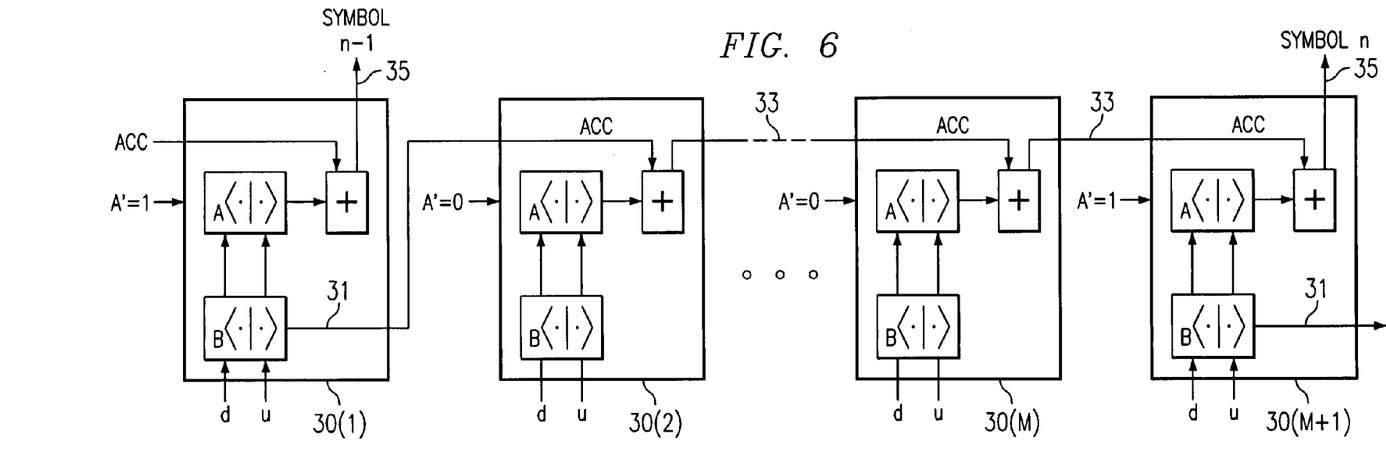
FIG. 6 is a diagram illustrating successive accesses made to the scalar product implementation of FIG. 5 to performed a combined de-scrambling and de-spreading operation.

As noted above, the status of the demodulation in any channel is given by the input values ACC and A' to the scalar product implementation. In order to let different channels access the implementation in a time shared manner, control must be carefully exercised over the inputs, and the correct values of ACC and A' must be timely provided for the channel that is currently accessing the implementation. This is illustrated in FIG. 6 showing a sequence of accesses to the scalar product implementation of FIG. 5 relating to a single path of one channel. At the first access 30(1) corresponding to the border between two data blocks, A=1 and the scalar product implementation calculates two partial scalar products, one which is added to the input ACC value (also referred to herein as SYM) to generate an output symbol value (symbol n−1) at reference 35, and another which is output as a first component of the next symbol value (symbol n) at reference 31.

Before a next access 30(2) occurs with respect to that path, the scalar product implementation of FIG. 5 may be shared and thus used by other paths, and other channels, to perform the de-spreading and de-scrambling operation. In order to ensure that future calculations are accurately performed, the partial scalar product output (at reference 31) for the first component of the next symbol n must be saved and then later retrieved when it is time for the path to again have access to the scalar product implementation. This saving operation with respect to the output 31 over-writes and clears the saved ACC that was previously stored.

With the next access 30(2) by the channel for that path, A=0 and the ACC value (saved as discussed above) is retrieved. The scalar product implementation then calculates a full-length scalar product that is added to the input ACC value (the first component of symbol n produced from access 30(1) at reference 31) to generate a cumulative component of the next symbol value (symbol n). This cumulative component output (at reference 33) again must be saved while the scalar product implementation is shared and used in connection with the accesses of other channels and paths.

The foregoing accesses 30 repeat themselves in a shared manner with other channels and paths until the M+1 access 30(M+1) is made for the path. Again, at the completion of each such processing, the output cumulative component output 33 is saved and then retrieved for processing use as the ACC input. At this point, corresponding once again to the border between two data blocks, A=1 and the scalar product implementation calculates two partial scalar products, one which is added to the input ACC value (reference 33 from preceding access 30(M)) to generate an output symbol value (symbol n) at reference 35, and another which is output as a first component of the next symbol value (symbol n+1) at reference 31.

In conclusion, the result of the combined de-scrambling and de-spreading operations is represented by the output sequences $y^{(f,c)}$. With reference once again to FIG. 2, this operation may take on the two forms of:

$$y^{(f_1,c_1)}(k) = \sum_{m=1}^{M} \langle d_{m+MK}^{ph(f_1)} | u_m^{(f_1,c_1)} \rangle \qquad (1)$$

and $$y^{(f_2,c_1)}(k) = \langle d_{MK+1}^{ph(f_2)} | u_1^{(f_2,c_1)} \rangle_{B,f_1} + \sum_{m=2}^{M} \langle d_{m+MK}^{ph(f_2)} | u_m^{(f_2,c_1)} \rangle_{A,f_1} + \langle d_{M(k+1)+1}^{ph(f_2)} | u_1^{(f_2,c_1)} \rangle \qquad (2)$$

Figure 7:
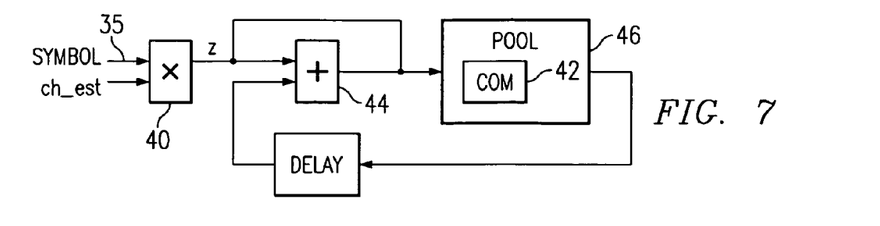
FIG. 7 is a de-rotation and accumulation implementation in accordance with the present invention.

The symbols y produced by the scalar product implementation of FIGS. 5–6, in accordance with Equations (1) and (2), for a given path next need to be de-rotated and then accumulated with the symbols for other paths (see, FIG. 2). Reference is now made to FIG. 7 wherein there is shown a de-rotation and accumulation implementation in accordance with the present invention. It will be remembered that de-rotation involves a complex valued multiplication 40 of the symbol (reference 35 from FIG. 6) with the channel estimation (ch_est) of the propagation path to which the symbol belongs. An accumulator 42 (referred to as COM, and selected from a pool of accumulators 46) receives input from a summer 44 that combines the symbols z output from the de-rotation multiplication 40 (using feedback).

Figure 8A:
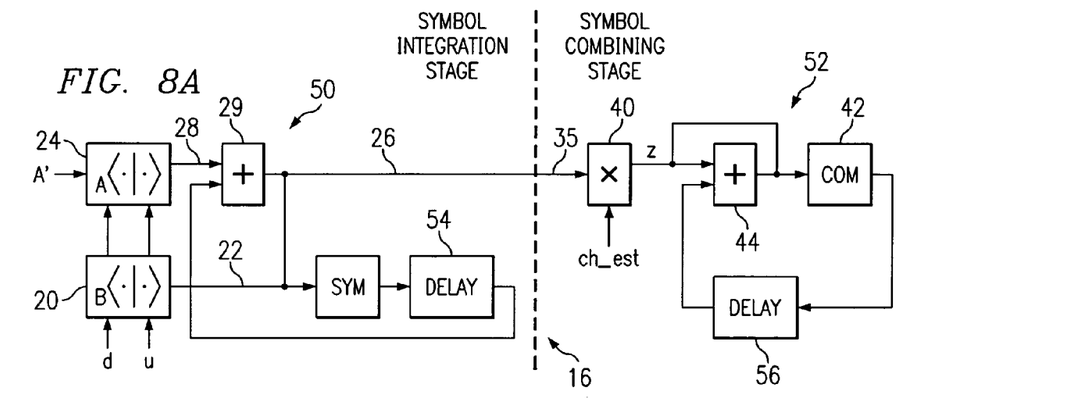
FIG. 8A is a block diagram of the shared data path.

Using combined FIGS. 5–7, the shared data path 16 may be represented by the block diagram of FIG. 8A. The data path 16 includes a symbol integration stage 50 (made up of the scalar product implementation of FIG. 5) and a symbol combining stage 52 (made up of the de-rotation and accumulation implementation of FIG. 7). It will be remembered that the data path 16 is occupied in a time shared manner by all of the channels c. The channel identity for accessing the data path 16 is defined by the physical channel c and its propagation path f. Access to the data path 16 is made in a pattern that repeats itself once every four chips (wherein a four chip period is referred to as a "time slot" and the period between two consecutive accesses to the data channel by two different channels is referred to as a "time unit"). The demodulation of a channel will typically span over multiple time slots due to its plural paths. Thus, it is recognized that the computation for demodulation for a certain channel is discontinuous. In order to be able to resume computation after a discontinuity, it is necessary to be able to specify the status of the computation and retrieve that status the next time that same channel makes an access to the data path 16. When accessing the data path 16, the proper data, as determined by the status for the channel, is routed through and handled by the data path.

The data path 16 serves the access requests of the channels by reiterating the symbol integration stage 50 M times and then enabling the symbol combining stage 52 once every M periods. Thus, at any time the data path 16 is assigned to a channel, either a symbol integration or a symbol combining operation is performed.

Figure 8B:
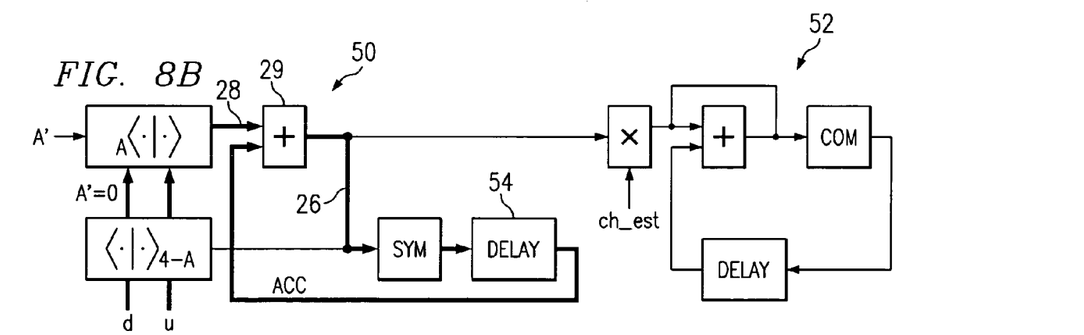
FIGS. 8B–8D are illustrations of the use of shared data path block diagram of FIG. 8A in processing operations to demodulate a spread spectrum signal.

Symbol integration is performed by symbol integration stage 50 by calculating the full-length scalar product (with $A'=0$) at reference 28 and adding the product to a previously calculated product value stored in the accumulator SYM value to produce an accumulated symbol output 26 that is then stored back in the accumulator SYM. A delay element 54 is provided to ensure the addition operation is performed with a previously stored product accumulation and not the currently calculated product. This symbol integration operation is illustrated in FIG. 8B where the activated portions of the data path 16 are shown in bold. The operation of FIG. 8B, with respect to FIG. 6, represents the operations being performed by the scalar product implementation at accesses 30(2) through 30(M). Again, it will be remembered that the illustration of FIG. 8B, as discussed above in FIG. 6 for each access 30, represents just a single access to the data path by a channel (physical channel and/or propagation path), and that multiple FIG. 8B operations are needed for each channel, and further that multiple FIG. 8B operations occur for other channels between successive operations for a given channel since the processing resource must be time shared.

Figure 8C:
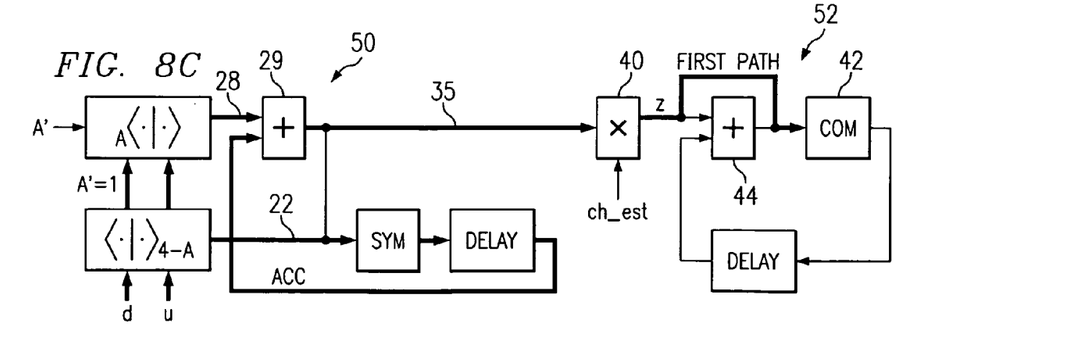

Symbol combining is performed by the symbol combining stage 52 after M symbol integrations have been completed on each data path of the channel c. Turning first, however, to symbol integration, for access 30(M+1), $A=1$ and two partial scalar products are calculated. The first (reference 31) is loaded into the accumulator SYM as the start of a new symbol integration. The second (reference 28) is added 29 to previously stored product accumulation SYM (from access 30(M)) for output 35 as the symbol z. If this is the first path f of the channel c, that output 35 symbol z is captured by the symbol combining stage 52, de-rotated by the multiplication at reference 40 and stored in the accumulator 42 COM (effectively by-passing the summer 44). This symbol integration and combining operation for the first path is illustrated in FIG. 8C where the activated portions of the data path 16 are shown in bold. The operation of FIG. 8C, with respect to FIG. 6, represents the operations being performed by the scalar product implementation at accesses 30(1) and 30(M+1). Again, it will be remembered that the illustration of FIG. 8C, as discussed above in FIG. 6 for each access 30, represents just a single access to the data path by a channel (physical channel and/or propagation path), and that multiple FIG. 8C operations are needed for each channel, and further that multiple FIG. 8C operations occur for other channels between successive operations for a given channel since the processing resource must be time shared.

Figure 8D:
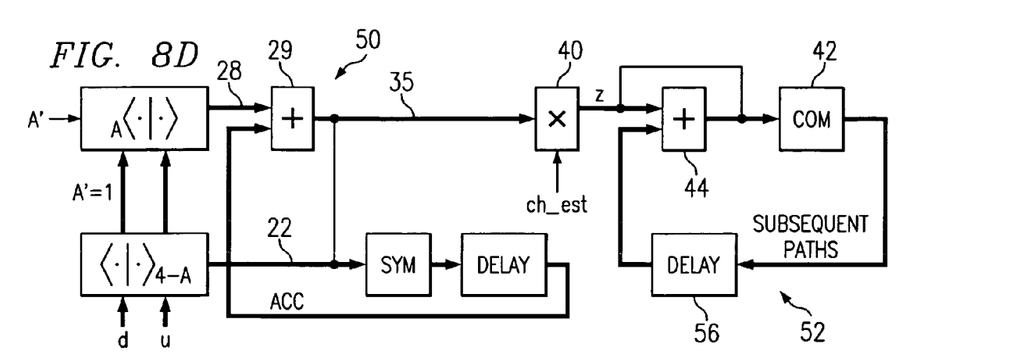

Next, the FIG. 8C operation in the symbol integration stage 50 is repeated for each of the paths f, with the corresponding symbol output z captured by the symbol combining stage 52, de-rotated (reference 40) and added 44 to the previously stored and accumulated values obtained from the accumulator 42 COM for that path. A delay element 56 is provided to ensure the addition operation is performed with a previously stored symbol accumulation and not the currently calculated symbol. This symbol combining operation for the subsequent paths is illustrated in FIG. 8D where the activated portions of the data path 16 are shown in bold. Again, it will be remembered that the illustration of FIG. 8D represents just a single access to the data path by a channel (physical channel and/or propagation path), and that multiple FIG. 8D operations are needed for each channel, and further that multiple FIG. 8D operations occur for other channels between successive operations for a given channel since the processing resource must be time shared.

As discussed above, the selection of the operation to be performed by the data path 16 at any particular channel access depends on the computation status of the channel. A finite state machine (FSM) may be defined to control this operation in view of the current status. The machine describes the sequence of operations to be performed for each of the channels. A set of state variables are used for each channel, and are dynamically updated during operation to reflect the proper status of the channel access, to select the proper operation to be performed.

At any point in time when a channel accesses the data path 16, the computation state of the channel is retrieved and the proper data for the code sequences (scrambling codes and channelization codes) are input (as the sequence u). Then, according to the current state of the channel, the correct operation is performed by the data path 16. These operations are controlled by the controller 12 (see, FIG. 1) in accordance with the finite state machine specification. Functionally, these operations reflect a data path allocation operation that executes the following procedures:

providing to the data path the proper codes (sequence u) for the channel that is being allocated access;

retrieving the state of the computation for that accessing channel; and choosing the proper accumulator to be assigned as the COM and SYM accumulator where the accumulated symbol related outputs are either stored or retrieved.

Figure 9:
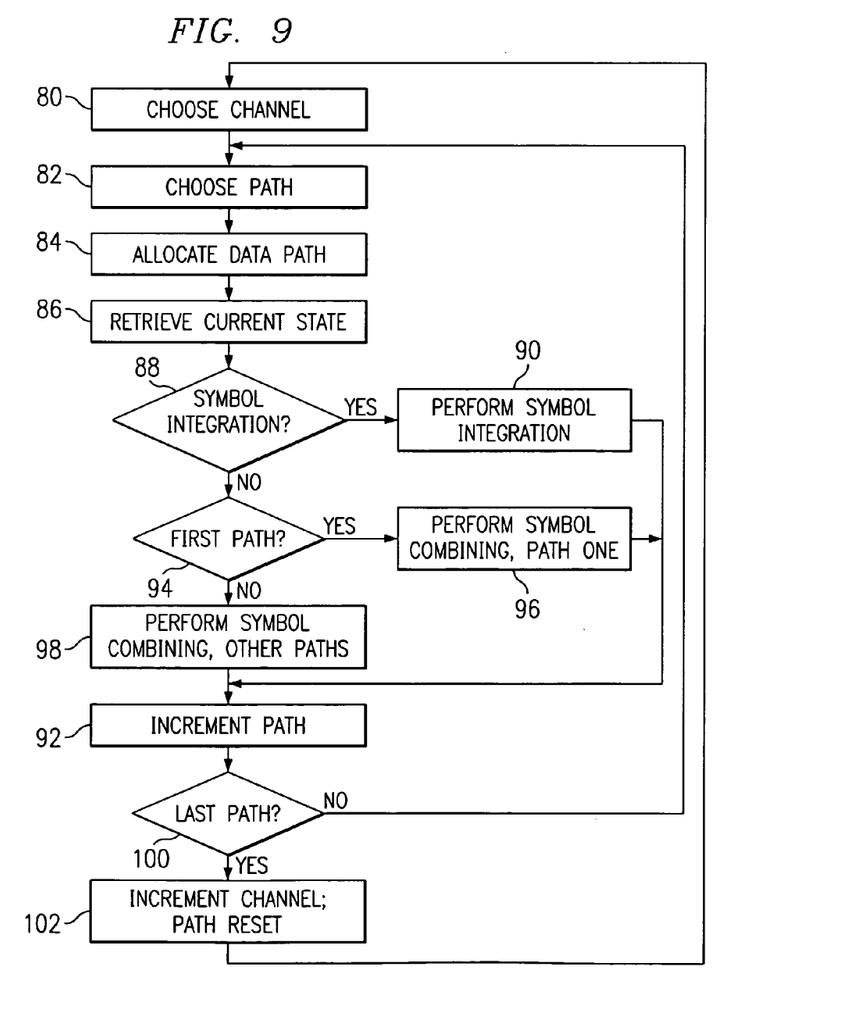
FIG. 9 is a flow diagram illustrating an iterative procedure for data path operation.

The overall behavior can then described by an iterative procedure that is executed every time slot and is illustrated in FIG. 9. In step 80, a one of the NOC physical channels is chosen. For that chosen physical channel, one of the NOP paths therein is chosen by step 82. For the chosen channel/path, the data path is allocated for processing in step 84. The current state of the chosen channel/path is then retrieved in step 86. If the current state is symbol integration, as determined in decision step 88, then a symbol integration operation as shown in FIG. 8B is performed in step 90 and the current state information is updated to reflect completion of this operation. It should be noted that all proper SYM/COM accumulator, input sequence d and sequence u information is loaded in conjunction with the performance of the symbol integration operation. The path is then incremented in step 92 and the process returns to step 82 to chose the next path. If decision step 88 indicates that the current state is not symbol integration, then it must be symbol combining and the process next determines in decision step 94 whether the current path (step 82) is the first path (path #1) for the step 80 chosen physical channel. If so, then a symbol combining operation as shown in FIG. 8C is performed in step 96 and the current state information is updated to reflect completion of this operation. If not, then a symbol combining operation as shown in FIG. 8D is performed in step 98 and the current state information is updated to reflect completion of this operation. In either case it should be noted that all proper SYM and COM accumulator, input sequence d, sequence u and ch_est information is loaded in conjunction with the performance of the symbol combining operation. Thereafter, the path is incremented in step 92 and the process returns to step 82 to chose the next path. Following each step 92, a determination is made in step 100 as to whether the last path for a given physical channel has been handled. If not, the process moves on to step 82 as described above. If so, the path is reset (back to the first path) and the channel is incremented in step 102, with the process then returning to step 80 to choose the next physical channel.

Figure 10:
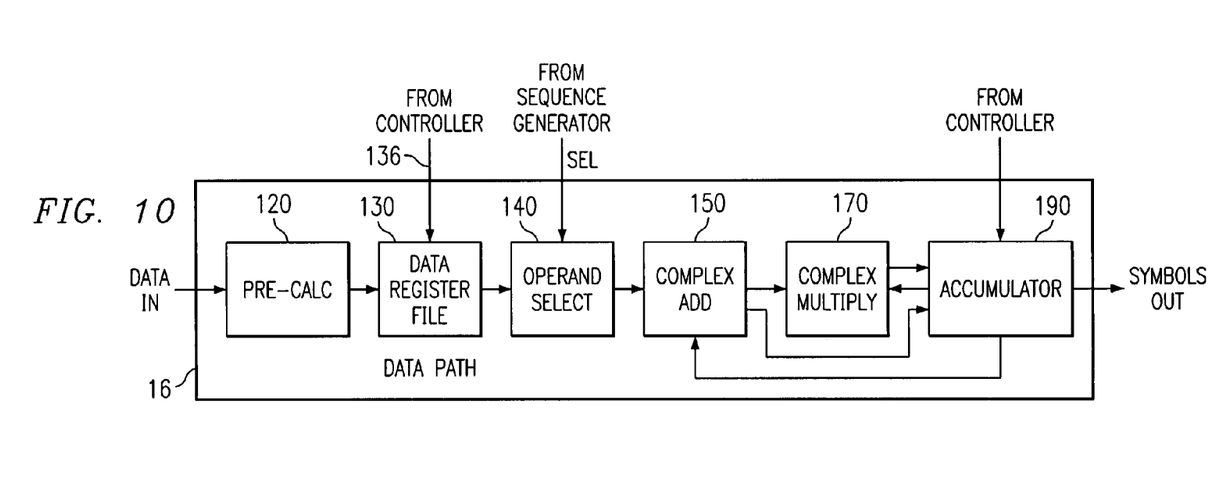
FIG. 10 is a block diagram for the structure of the data path.

Reference is now made to FIG. 10 wherein there is shown a block diagram for the structure of the data path 16. The data path 16 is comprised of a precalculation block 120, a data register file block 130, an operand selection block 140, a complex adder block 150, a complex multiplier block 170, and an accumulator block 190. The precalculation block 120 is connected to provide input to the data register file block 130, which also receives input from the controller 12. The data register file block 130 is connected to provide input to the operand selection block 140, which also receives input from the sequence generator 14. The operand selection block 140 is connected to provide input to the complex adder block 150, which also receives input from the accumulator block 190. The complex adder block 150 provides input to both the complex multiplier block 170 and the accumulator block 190. Finally, the complex multiplier block 170 also provides input to the accumulator block 190, which also receives input from the controller 12.

Figure 11:
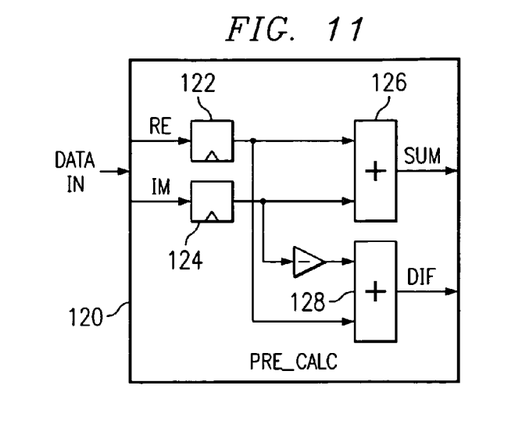
FIG. 11 is a block diagram of a precalculation block in the data path structure of FIG. 10.

Reference is now made to FIG. 11 wherein there is shown a block diagram of a precalculation block 120 in the data path 16 shown in FIG. 10. The block 120 receives both the real (RE) and the imaginary (IM) components of the received sample data sequence d and then calculates values of certain preliminary data (SUM and DIF) that are used in calculating scalar products. More specifically, the block 120 calculates the preliminary data for the calculation of:

$$\langle d_m^{ph(f_1)} | u_m \rangle_4$$

for any value of the phase and any value of the code sequence u. From the discussion above, it will be recalled that by definition:

$$\langle d_m^{ph(f_1)} | u_m^{(f_j,c_k)} \rangle_4 = \sum_{k=1}^{4} d^{ph(j)}(4m+k) \cdot u_m^{(f_j,c_k)}(k) \quad (3)$$

Each term of the addition in Equation (3) can be written as follows:

$$d^{ph(h)}(4m+k) \cdot u_m^{(f_h,c_k)}(k) = \begin{cases} d^{ph(h)}(4m+k) \cdot \exp(j\pi/4) & \text{for } \bar{u}_m^{(f_h,c_k)}(k) \in U_1 \\ d^{ph(h)}(4m+k) \cdot \exp(j3\pi/4) & \text{for } \bar{u}_m^{(f_h,c_k)}(k) \in U_2 \\ d^{ph(h)}(4m+k) \cdot \exp(j5\pi/4) & \text{for } \bar{u}_m^{(f_h,c_k)}(k) \in U_3 \\ d^{ph(h)}(4m+k) \cdot \exp(j7\pi/4) & \text{for } \bar{u}_m^{(f_h,c_k)}(k) \in U_4 \end{cases}$$

where $\bar{u}(k)$ is the three-component vector:

$$u(k) = p(k) \cdot q(k)$$

$$\bar{u}(k) = (Re\{p(k)\}, Im\{p(k)\}, q(k))$$

The table set forth below maps $\bar{u}(k)$ and $U_1, U_2, U_3, U_4$:

|    | Re{p} | Im{p} | q  |
|----|-------|-------|----|
| U1 | 1     | 1     | 1  |
|    | −1    | −1    | −1 |
| U2 | 1     | 1     | −1 |
|    | −1    | −1    | 1  |
| U3 | 1     | −1    | 1  |
|    | −1    | 1     | −1 |
| U4 | 1     | −1    | −1 |
|    | −1    | 1     | 1  |

By naming the following quantities:

$$A^{ph(h)}(k) = Re\{d^{ph(h)}(4m+k)\}$$

$$B^{ph(h)}(k) = Im\{d^{ph(h)}(4m+k)\}$$

the expression set forth above becomes:

$$d^{ph(h)}(4m+k) \cdot u_m^{(f_h,c_k)}(k) = \begin{cases} A^{ph(h)}(k) + jB^{ph(h)}(k) & \text{for } \bar{u}_m^{(f_h,c_k)}(k) \in U_1 \\ -A^{ph(h)}(k) - jB^{ph(h)}(k) & \text{for } \bar{u}_m^{(f_h,c_k)}(k) \in U_2 \\ B^{ph(h)}(k) - jA^{ph(h)}(k) & \text{for } \bar{u}_m^{(f_h,c_k)}(k) \in U_3 \\ B^{ph(h)}(k) + jA^{ph(h)}(k) & \text{for } \bar{u}_m^{(f_h,c_k)}(k) \in U_4 \end{cases}$$

By naming the common terms:

$$SUM^{ph(h)}(k) = A^{ph(h)}(k) + B^{ph(h)}(k)$$

$$DIF^{ph(h)}(k) = A^{ph(h)}(k) - B^{ph(h)}(k)$$

the foregoing expression may be further reduced to:

$$d^{ph(h)}(4m+k) \cdot u_m^{(f_h,c_k)}(k) \begin{cases} SUM^{ph(h)}(k) & \text{for } \bar{u}_m^{(f_h,c_k)}(k) \in U_1 \\ -SUM^{ph(h)}(k) & \text{for } \bar{u}_m^{(f_h,c_k)}(k) \in U_2 \\ -DIF^{ph(h)}(k) & \text{for } \bar{u}_m^{(f_h,c_k)}(k) \in U_3 \\ DIF^{ph(h)}(k) & \text{for } \bar{u}_m^{(f_h,c_k)}(k) \in U_4 \end{cases} \quad (4)$$

The advantage of the expression (4) is that the terms SUM and DIF do not depend on the channel. The role of the channel is merely to select the proper SUM or DIF term to be calculated at a given time. The total number of terms to be calculated depends only on the number of phases that the propagation paths may have. The upper bound on the number of phases is the number of samples per chip. For example, for a sampling rate that is four times the chip rate, if the block 120 uses expression (4) and calculates just eight values (SUM's one to four and DIF's one to four), it is possible to have the demodulation of all the channels (for example up to sixty-four) advance by one chip (for time k).

The block 120 accordingly receives the real and imaginary components of the data sequence d. Operations 122 and 124 calculate, from the real and imaginary components, respectively, the $A^{ph(h)}(k)$ and $B^{ph(h)}(k)$ values. A first summer 126 then computes the SUM value, and a second summer 128 computes the DIF value in accordance with the expressions recited above.

Figure 12:
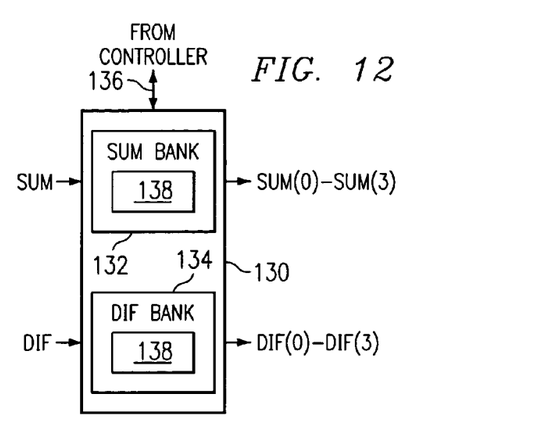
FIG. 12 is a block diagram of a data register file block in the data path structure of FIG. 10.

Reference is now made to FIG. 12 wherein there is shown a block diagram of a data register file block 130 in the data path structure of FIG. 10. The data register file block 130 includes two register banks. A first bank, referred to as the SUM bank 132, stores SUM values output from the precalculation block 120. The second bank, referred to as the DIF bank 134, stores DIF values output from the precalculation block 120. The banks 132 and 134 are separately and independently accessible for both reading and writing operations. An address bus 136 connected to the controller 12 carries the read and write addresses for the data register file block 130. The addresses specifies which of the banks 132 or 134 is being accessed (for a read or write) and a specific location 138 therein that is related to the channel and phase of the data sequence d to which the SUM and DIF values relate. A new read/write address is generated with every sampling period, so that the complete set of address locations 138 in the data register file block 130 is accessed once every eight chip periods (i.e., every two time slots). The read and write operations utilize banks: for example, when writing SUM values to bank 132, DIF values are being read from bank 134, and vice versa. The output of each read operation is four values (either four SUM(0)–SUM(3) values, or four DIF((0)–DIF(3) values).

Figure 13:
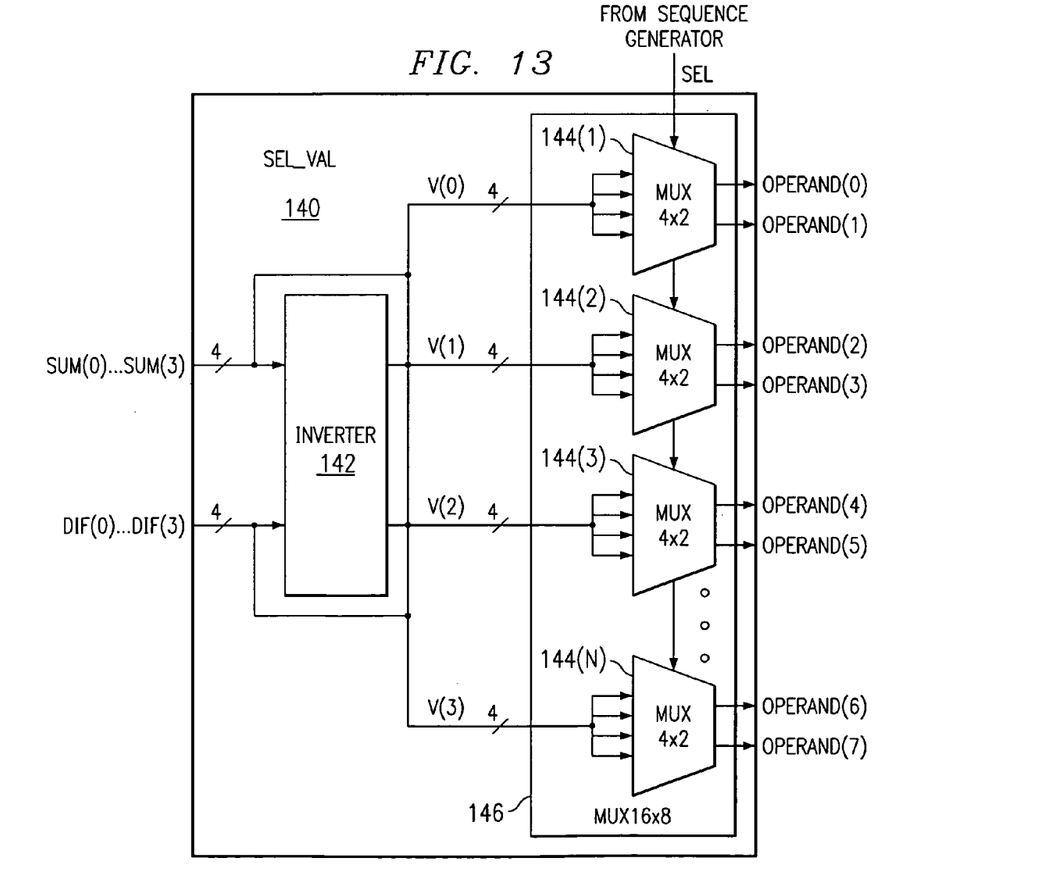
FIG. 13 is a block diagram of an operand selection block in the data path structure of FIG. 10.

Reference is now made to FIG. 13 wherein there is shown a block diagram of an operand selection block 140 in the data path structure of FIG. 10. The operand selection block 140 receives an input from the data register file block 130 comprising four SUM(0)–SUM(3) values and or four DIF (0)–DIF(3) values read out from the banks 132/134. An inverter 142 performs a sign inversion on the SUM(0)–SUM (3) and DIF(0)–DIF(3) values. Using the original values and the inversions, a vector V(n) may be defined as follows:

$$V(n)=[SUM(n),-SUM(n),DIF(n),-DIF(n)], n=0,1,2,3$$

A 4×2 multiplexer 144(n) is associated with each vector, with the multiplexer 144 operating, under the control of a selection signal (SEL) received from the sequence generator 14 (FIG. 1) to choose for output two of the input four values from the vector V(n) as follows:

$$mux4\times2[V(n),SEL]=[x(n),y(n)], n=0,1,2,3$$

The selection signal SEL is a three-bit word that increments at the clock rate to choose the SUM and DIF values for output in the manner set forth in following table:

| SEL | x(n) | y(n) |
|-----|------|------|
| 000 | SUM(n) | −SUM(n) |
| 001 | DIF(n) | −DIF(n) |
| 010 | −SUM(n) | DIF(n) |
| 011 | −DIF(n) | SUM(n) |
| 100 | −DIF(n) | SUM(n) |
| 101 | −SUM(n) | DIF(n) |
| 110 | DIF(n) | −DIF(n) |
| 111 | SUM(n) | −SUM(n) |

The 4×2 multiplexers 144(n) thus form a 16×8 multiplexer 146 that selects for output eight of the input sixteen values from the four vectors V(n) as follows:

$$mux16\times8[(V(0),V(1),V(2),V(3)]=[mux4\times2(V(0)), \\ mux4\times2(V(1)),mux4\times2(V(2)),mux4\times2(V(n))]$$

with the eight output values comprising OPERAND(0, . . . , 7) which represent four complex-valued numbers (wherein four values are real parts and the other four values are imaginary parts).

Figure 14:
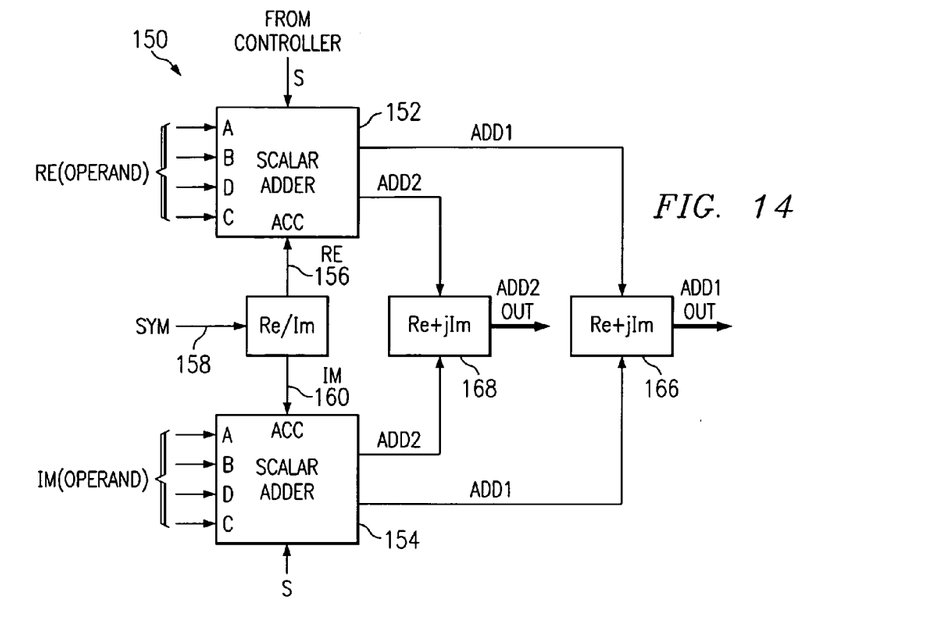
FIG. 14 is a block diagram of a complex adder block in the data path structure of FIG. 10.

Reference is now made to FIG. 14 wherein there is shown a block diagram of a complex adder block 150 in the data path structure of FIG. 10. The complex adder block 150 includes a first scalar adder 152 and a second scalar adder 154. The first scalar adder 152 operates to add the four real parts of the OPERAND values output from the operand selection block 140 together with a real part 156 of a current accumulator SYM value 158 received from the accumulator block 190. The second scalar adder 154 operates to add the four imaginary parts of the OPERAND values output from the operand selection block 140 together with an imaginary part 160 of the current accumulator SYM value 158 received from the accumulator block 190. The purpose of this operation is to accumulate the new complex OPERAND values to the current accumulator SYM value 158 (representing previous accumulated OPERAND values).

It will be remembered that the accumulation process is independently repeated for any channel, and thus the selection of the OPERAND values and the current accumulator COM value 158 depends on the current channel/path that is accessing the data path 16. To accomplish a coordination between the supply of the proper OPERAND values and the supply of the proper current accumulator COM value 158, the controller 12 (FIG. 1) simultaneously selects for output from the operand selection block 140 and the accumulator block 190 the proper values based on the channel/path that is currently accessing the data path 16 (as dictated by the execution of the process of FIG. 9.

Figure 15:
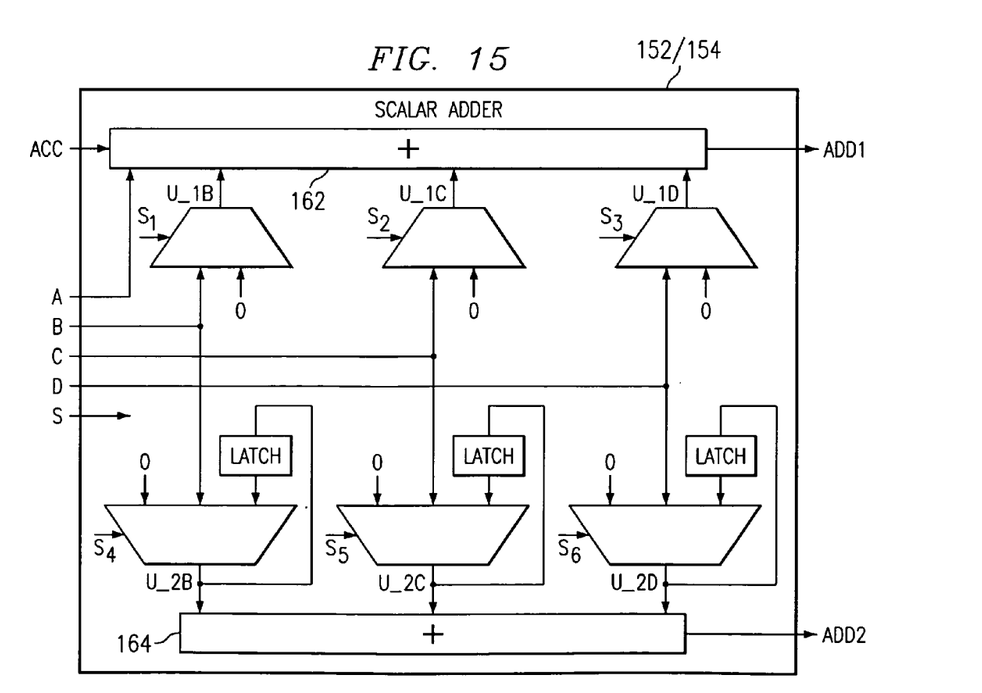
FIG. 15 is a block diagram of an internal structure for a scalar adder used within the complex adder block of FIG. 14.

Each of the scalar adders 152/154 has an internal structure illustrated in FIG. 15. Each scalar adder 152/154 includes a first adder 162 and a second adder 164. The first adder 162 is capable of selectively performing any one of the following operations:

$$ADD1=COM+A+B+C+D$$

$$ADD1=COM+A+B+C$$

ADD1=COM+A+B

ADD1=COM+A wherein: A=OPERAND(0) real or OPERAND(1) imaginary
B=OPERAND(2) real or OPERAND(3) imaginary
C=OPERAND(4) real or OPERAND(5) imaginary
D=OPERAND(6) real or OPERAND(7) imaginary.

The second adder 164 is capable of selectively performing any one of the following operations:

ADD2=B+C+D

ADD2=C+D

ADD2=D

A control value (S) received from the controller 12 (FIG. 1) coordinates the ADD1 and ADD2 outputs in the manner set forth in the following table:

| Control S | AAD1 | ADD2 |
|---|---|---|
| 0 | COM+A+B+C+D | |
| 1 | COM+A+B+C | D |
| 2 | COM+A+B | C+D |
| 3 | COM+A | B+C+D |

It will be noted that when control value S=0, there is not an ADD2 output. This allows the first adder 162 to always be activated for a new calculation whenever there are new OPERANDs to process. The second adder 164 is activated (S=1,2,3) only when a double-accumulation is needed, and is thus prevented from running unless calculations.

A combiner 166 is provided to combine the Re(ADD1) value from the first scalar adder 152 with the Im(ADD1) value obtained from the second scalar adder 154 and produce an ADD1OUT value. Similarly, another combiner 168 is provided to combine the Re(ADD2) value from the first scalar adder 152 with the Im(ADD2) value obtained from the second scalar adder 154 and produce an ADD2OUT value. The ADD1OUT and ADD2OUT values represent the completed de-spreading and de-scrambling of the received data sequence d.

Figure 16:
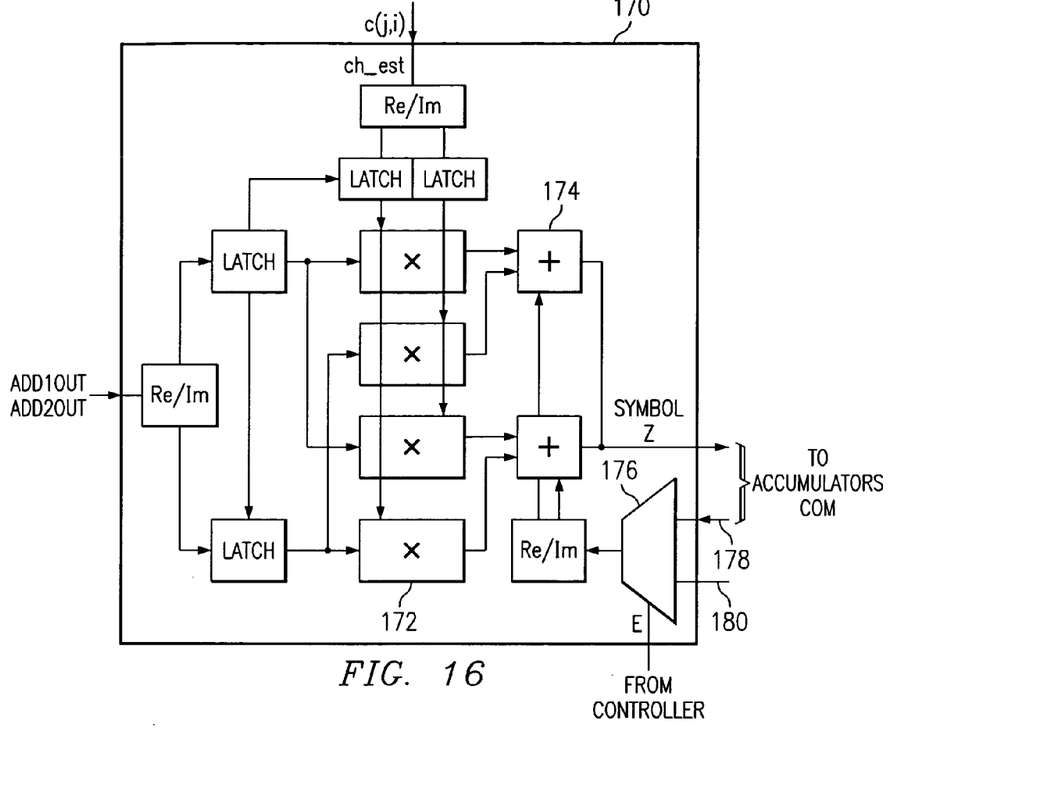
FIG. 16 a block diagram of a complex multiplier block in the data path structure of FIG. 10.

Reference is now made to FIG. 16 wherein there is shown a block diagram of a complex multiplier block 170 in the data path structure of FIG. 10. The complex multiplier block 170 performs the operation to de-rotate the symbol values produced from the complex adder block 150 as a result of completed de-spreading and de-scrambling of the data sequence d. The de-rotated symbols are output from the complex multiplier block 170 for storage in the accumulator block 190 as COM values. The complex multiplier block 170 then further performs the function of accumulating the COM values over each of the paths.

An enable control bit (E) received from the controller 12 (FIG. 1) defines the operation performed by the complex multiplier block 170. When E=0, the symbol is de-rotated by multiplying the symbol with the ch_est value, and then the symbol combining operation for the first path (as illustrated in FIG. 8C) is performed with respect to that de-rotated symbol. When E=1, on the other hand, the symbol is again de-rotated by multiplying the symbol with the ch_est value, but then the symbol combining operation for the remaining paths (as illustrated in FIG. 8D) is performed with respect to that de-rotated symbol.

The complex multiplication to de-rotate the symbol is performed by the multipliers 172 in accordance with the following algorithm:

$Re\{Z\}=Re\{ADDOUT\} \times Re\{ch\_est\}-Im\{ADDOUT\} \times Im\{ch\_est\}$ and $Im\{Z\}=Re\{ADDOUT\} \times Im\{ch\_est\}+Im\{ADDOUT\} \times Re\{ch\_est\}$ $Z=Re\{Z\}+jIm(Z)$ is then stored in the accumulator block 190 as the COM value. The selective addition and subtraction operations needed to form the $Re\{Z\}$ and $Im(Z)$ values is accomplished using the summers 174.

The summers 174 further perform the multi-path accumulation process. A multiplexer 176 receives an accumulated Z value 178 from the accumulator block 190 and a zero value 180. The enable control bit (E) chooses which of those values is selected for further processing. When E=0, this is a path accumulation relating to the first path (see, FIG. 8C) and the zero value 180 is selected by the multiplexer 176 and applied (in real and imaginary parts) to the summers 174. When E=1, however, the accumulated Z value 178 (COM) from the accumulator block 190 is selected by the multiplexer 176 and applied (in real and imaginary parts) to the summers 174 to be added to de-rotated Z value for the current path and further accumulate the symbol values for a given channel.

Figure 17:
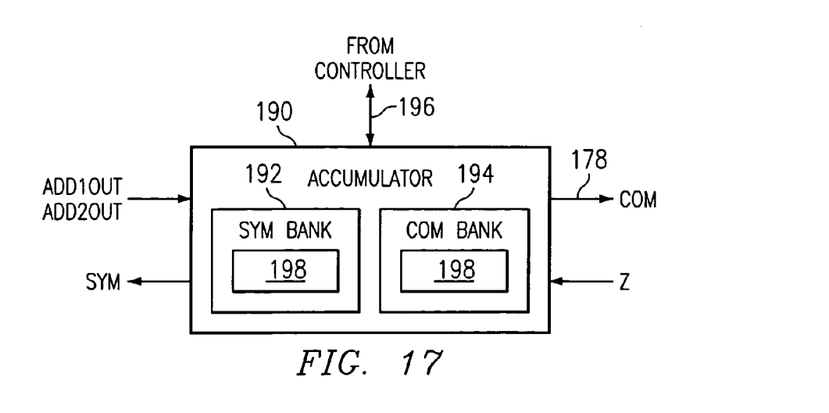
FIG. 17 is a block diagram of an accumulator block in the data path structure of FIG. 10.

Reference is now made to FIG. 17 wherein there is shown a block diagram of an accumulator block 190 in the data path structure of FIG. 10. The accumulator block 190 includes a first accumulator bank 192 that is used for the symbol integration operation (see, FIG. 8B) to store the intermediate SYM values used in the de-spreading and de-scrambling operation. This accumulator bank 192 receives the ADD1OUT and ADD2OUT values produced by the complex adder block 150 and supplies the SYS ACC value that is input to the complex adder block. The accumulator block 190 further includes a second accumulator bank 194 that is used for the symbol combining operation (see, FIGS. 8C and 8D) to store the intermediate COM values used in the accumulation of the symbols over the plural paths of the channel. An address bus 196 that is connected to the controller 12 carries the read and write addresses for the accumulator block 190, and more specifically the banks 192 and 194 therein. The addresses specify which of the banks 192 or 194 is being accessed (for a read or write) and a specific location 198 therein that is being used for data handling. The addresses are generated based on the channel/path that is currently accessing the data path 16 in order to specify where intermediate data (SYS and COM) is to be stored and/or retrieved for purposes of performing the symbol integration and symbol accumulation operations.

The demodulator of FIG. 1 is preferably implemented as an integrated circuit. Alternatively, portions of the FIG. 1 demodulator may be implemented as integrated circuits. Still further, each portion of the demodulator may comprise its own integrated circuit, with the collection of integrated circuits forming a chip set for demodulation functions. Still further, all or part of the demodulator of FIG. 1 may be implemented in software, or in firmware, or in a combination of both.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A demodulator for demodulating a spread spectrum signal transmitted over a physical channel and received with multiple instances corresponding to plural propagation paths, comprising:
 a demodulating data path operable to perform spread spectrum demodulating operations by performing de-scrambling and de-spreading operations to produce recovered symbols and performing de-rotating operation on the recovered symbols; and
 a control system operable to manage time-shared access to the demodulating data path for performing spread spectrum demodulating operations on each of the instances of the spread spectrum signal in a time divided manner such that the control system grants a first time-shared access to the demodulating data path to perform de-scrambling and de-spreading and grants a second time-shared access to the demodulating data path to perform de-rotating.

2. The demodulator of claim 1 wherein the demodulating data path includes a de-scrambling and de-spreading stage, and the control system operates to manage first time-shared access to the de-scrambling and de-spreading stage of the demodulating data path for performing de-scrambling and de-spreading operations on each of the instances of the spread spectrum signal in the time divided manner.

3. The demodulator of claim 2 wherein the demodulating data path further includes a de-rotating stage, and the control system operates to manage second time-shared access to the de-rotating stage of the demodulating data path for performing de-rotating operations on symbols within each of the instances of the spread spectrum signal in the time divided manner.

4. The demodulator of claim 3 wherein the demodulating data path further includes a symbol accumulating stage, and the control system further operates to manage a third time-shared access to the symbol accumulating stage for performing accumulating operations on de-rotated symbols from each of the instances of the spread spectrum signal in the time divided manner to generate an accumulated symbol from across all propagation paths for the physical channel.

5. The demodulator as in claim 1 wherein the demodulator is fabricated as an integrated circuit.

6. A demodulator for demodulating spread spectrum signals transmitted over a plurality of channels, comprising:
 a demodulating data path operable to perform spread spectrum de-scrambling/de-spreading, de-rotating and accumulating operations, wherein the demodulating data path is a shared processing resource with respect to performing operations as to all received multi-path signals of the plurality of channels; and
 a control system operable to manage time-shared access to the demodulating data path shared processing resource for performing spread spectrum demodulating operations on each of the plurality of channels, and multi-path signals therein, in a time divided manner such that de-scrambling/de-spreading operations are performed in a first time divided period and de-rotating operations are performed in a second time divided period.

7. The demodulator of claim 6 wherein the control system further operates to manage time-shared access to the demodulating data path such that accumulating the de-rotated symbols from the multi-paths within each of the plurality of channels are performed in a third time divided period to generate an accumulated symbol from across all multi-paths for each of the spread spectrum signals.

8. The demodulator as in claim 6 wherein the demodulator is fabricated as an integrated circuit.

9. The demodulator as in claim 6 wherein the plurality of channels are a plurality of physical channels.

10. A method for demodulating a spread spectrum signal transmitted over a physical channel and received with multiple instances corresponding to plural propagation paths, comprising the steps of:
 performing spread spectrum de-scrambling and de-spreading demodulating operations on the received spread spectrum signal to produce recovered symbols and performing de-rotating operation on the recovered symbols along a single demodulating data path; and
 managing time-shared access to the demodulating data path for performing spread spectrum demodulating operations on each of the instances of the spread spectrum signal in a time divided manner such that a first time-shared access is granted to the demodulating data path to perform de-scrambling and de-spreading and a second time-shared access is granted to the demodulating data path to perform de-rotating.

11. The method of claim 10 wherein the step of performing comprises the step of de-scrambling and de-spreading, and the step of managing comprises the step of time-shared allocating each of the instances of the spread spectrum signal to the single demodulation data path in the time divided manner for performance of the de-scrambling and de-spreading step during the first time-shared access.

12. The method of claim 11 wherein the step of performing further comprises the step of de-rotating, and the step of managing further comprises the step of time-shared allocating each of the instances of the spread spectrum signal to the single demodulation data path in the time divided manner for performance of the de-rotating step during the second time-shared access.

13. The method of claim 12 wherein the step of performing further comprises the step of accumulating de-rotated symbols from all propagation paths for the physical channel, and the step of managing further comprises the step of time-shared allocating each of the instances of the spread spectrum signal to the single demodulation data path in the time divided manner for performance of the accumulating step to generate an accumulated symbol from across all propagation paths for the physical channel during a third time-shared access.

14. A method demodulating spread spectrum signals transmitted over a plurality of channels, comprising:
 performing spread spectrum de-scrambling/de-spreading, de-rotating and accumulating operations on the received spread spectrum signals along a single demodulating data path, wherein the demodulating data path is a shared processing resource with respect to performing operations as to all received multi-path signals of the plurality of channels; and
 managing time-shared access to the demodulating data path shared processing resource for performing spread spectrum demodulating operations on each of the plurality of channels, and multi-path signals therein, in a time divided manner such that de-scrambling/de-spreading operations are performed in a first time divided period and de-rotating operations are performed in a second time divided period.

15. The method of claim 14 wherein the step of managing comprises the step of selectively granting each of the plurality of channels, and multi-path signals therein, access to the single demodulation data path in a third time divided period for performance of the accumulating operation to generate an accumulated symbol from across all multi-paths for each of the spread spectrum signals.

16. The method as in claim 14 wherein the plurality of channels are a plurality of physical channels.

17. A demodulator for spread spectrum signals, comprising:
   a shared access data path, comprising:
      a symbol integration stage operable to perform de-scrambling and de-spreading operations on the spread spectrum signals to produce recovered symbols; and
      a symbol combining stage operable to perform de-rotation on the recovered symbols and to accumulate de-rotated symbols and produce a output symbol; and
   a control circuit selectively granting each spread spectrum signal time divided access to the shared access data path for the purpose of utilizing an appropriate one of the symbol integration stage and the symbol combining stage to operate on the spread spectrum signals, wherein the control circuit grants a first time divided access to the symbol integration stage with respect to a certain spread spectrum signal to de-scramble and de-spread that certain spread spectrum signal and recover a first symbol, and wherein the control circuit grants a second time divided access to the symbol combining stage to de-rotate that first symbol of the certain spread spectrum signal.

18. The demodulator of claim 17 wherein the control circuit grants a third time divided access to the symbol combining stage to accumulate that first symbol with other symbols to produce the output symbol for that certain spread spectrum signal.

19. The demodulator of claim 18 wherein each of the first, second and third time divided accesses with respect to the certain spread spectrum signal are interposed with other control circuit granted time divided accesses to the shared access data path for the handling of spread spectrum signals other than the certain spread spectrum signal.

20. The demodulator of claim 19 wherein the other spread spectrum signals comprise signals on other propagation paths for a same physical channel.

21. The demodulator of claim 17 wherein the spread spectrum signals comprise signals from plural physical channels.

22. The demodulator of claim 17 wherein the spread spectrum signals comprise signals from plural propagation paths of a single physical channel.

\* \* \* \* \*

UNITED STATES PATENT AND TRADEMARK OFFICE
CERTIFICATE OF CORRECTION

PATENT NO. : 7,103,091 B2  
APPLICATION NO. : 10/141460  
DATED : September 5, 2006  
INVENTOR(S) : Stefano Cervini Page 1 of 1

It is certified that error appears in the above-identified patent and that said Letters Patent is hereby corrected as shown below:

Column 3, line 62    Replace "$c_1$"  
With --$c_i$--

Signed and Sealed this

Fifth Day of December, 2006

JON W. DUDAS  
*Director of the United States Patent and Trademark Office*